United States Patent Office 3,572,992
Patented Mar. 30, 1971

3,572,992
PREPARATION OF MOULDED AND SINTERED
ALUMINUM NITRIDE
Katsutoshi Komeya, Kawasaki-shi, and Hiroshi Inoue,
Kawaguchi-shi, Japan, assignors to Tokyo Shibaura
Electric Co., Ltd., Kawasaki-shi, Japan
No Drawing. Filed July 1, 1968, Ser. No. 741,321
Claims priority, application Japan, July 5, 1967,
42/42,837; Sept. 11, 1967, 42/58,243; Feb. 29,
1968, 43/12,524
Int. Cl. C01b 21/06
U.S. Cl. 23—192                                    7 Claims

ABSTRACT OF THE DISCLOSURE

A method of manufacturing a moulded and sintered mass of aluminum nitride comprising moulding an admixture of aluminum nitride powder, aluminum oxide powder and metallic aluminum powder, nitriding the moulded mass in nitrogen or ammonia gas at a temperature below the melting point of metallic aluminum, and sintering the mass in nitrogen or inert gas at temperatures ranging from 1,600 to 2,200° C.

---

The present invention relates to a method of preparing a moulded and sintered mass of aluminum nitride, and more particularly to a method of preparing a moulded and sintered mass of aluminum nitride from the admixture of aluminum nitride powder, aluminum oxide powder and metallic aluminum powder.

Aluminum nitride has a heat conductivity about two or three times greater than that of alumina, a greater strength at high temperatures as compared to other ceramics, an excellent thermal shock resisting property by virtue of a low thermal coefficient property, an excellent high temperature corrosion resisting property against acids and molten metals, excellent electrically insulating property and dielectric constant at high frequency region, and outstandingly small dielectric loss factor.

Owing to these various excellent properties, aluminum nitride finds broad application as heat resistant material, insulating material, dielectric material at elevated temperatures, a material for melting pots for silicon, germanium, gallium, aluminum and the like.

Conventionally, this type of moulded and sintered mass of aluminum nitride is obtained by shaping aluminum nitride powder into a desired configuration, and then sintering the shaped article in a nitrogen atmosphere. It is also obtained by adding a small amount of binding agent to a mixture of aluminum nitride powder and metallic aluminum powder and compression moulding the admixture followed by sintering it in a nitrogen atmosphere to bring about nitriding reaction of the moulded mass. The moulded and sintered mass obtained by the former process, however, has a great pore factor and does not have a adequate mechanical strength. Although the latter method provides improved density and mechanical strength, an organic binding agent, such as paraffin, stearic acid, polyvinyl alcohol and the like adheres to the surfaces of particles of metallic aluminum powder when it is used at the time of moulding the admixture and is difficult to remove completely even with a removing operation prior to the nitriding reaction of aluminum. As a consequence, the binding agent remaining in the moulded mass undergoes decomposition at the time of sintering and remains in the sintered mass as free carbon. The free carbon thus resulted will not react with aluminum nitride. As the metallic aluminum is eventually converted into stable aluminum nitride, the free carbon inevitably remains as an impurity in the sintered mass even with a further sintering operation at a high temperature after the nitriding reaction. When a crucible made of the moulded and sintered mass of aluminum nitride containing residual carbon is used for melting metals such as aluminum, residual carbon reacts with the moult contained in the crucible and the reaction products not only contaminates the moult to decrease the purity thereof but also shorten the service life of the crucible. Further with the latter method, the heat produced during nitriding reaction of aluminum fuses the non-reacting aluminum and causes it to coagulate, giving rise to heterogeneous structure of the moulded and sintered mass.

The main object of the invention is to eliminate the aforementioned drawbacks and to provide a method of manufacturing a moulded and sintered aluminum nitride mass of high purity, of high density and good mechanical strength, in which residual carbon remaining in the moulded and sintered mass of aluminum nitride is extremely small. It comprises the steps of compression moulding the admixture of aluminum nitride powder, aluminum oxide powder and metallic aluminum powder after the addition of an organic binding agent, heating the moulded mass in a nitrogen gas or in an inert gas to partially evaporate the organic binding agent, carrying out nitriding reaction of the aluminum contained in said moulded mass in a nitrogen or ammonia gas at a temperature below the melting point of the aluminum, and sintering the moulded mass in a nitrogen or inert gas at a temperature of from 1,600 to 2,200° C.

As required, the grain sizes and mixing proportions of aluminum nitride and metallic aluminum are preferably controlled. Further, the step of eliminating an organic binding agent and the high temperature sintering step may be preferably carried out by embedding the mass in a high temperature melting powder contained in a muffle, whereas the nitriding reaction of the powdery aluminum is carried out by taking the moulded mass out of the muffle.

In the new methods of the invention, elimination of the organic binding agent involves a partial evaporation of the binding agent and decomposition of the residual binding agent to form carbon. Then the free carbon produced by the decomposition of the organic binding agent from the moulded and sintered mass of aluminum nitride is removed as carbon monoxide by adding aluminum oxide powder to the starting material containing aluminum nitride powder and aluminum metal powder.

The aluminum oxide reacts with the residual carbon in the moulded and sintered mass of aluminum nitride at a temperature of over 1,600° C. as represented by

$$Al_2O_3 + 3C + N_2 \rightarrow 2AlN + 3CO$$

whereby the free carbon is converted into carbon monoxide. The weight of aluminum oxide to be added, therefore, suffices if it is at least equal to 2.8 times the weight of carbon contained in the organic binding agent. Even if the aluminum oxide added remains in the moulded and sintered mass as the non-reacting component, it will present no difficulty in the application of such sintered mass since aluminum oxide, a melting point thereof being 2,050° C., is excellent in anti-corrosion property against molten metals and is more readily sintered than aluminum nitride, thus elevating the mechanical strength of the sintered mass. However, it is of course desirable to minimise the residual content of aluminum oxide to make most of the use of property of aluminum nitride such as unwettability by metal baths.

The inventors have also found that, by regulating the average particle size of aluminum nitride powder within 0.5 to 2.5 microns and the average particle size of metallic aluminum powder below 2.5 microns, and selecting the mixing proportion of aluminum nitride to be one to three times the metallic aluminum, a moulded and sintered mass of aluminum nitride of high density, homogeneous structure and excellent mechanical strength may be obtained.

Although aluminum nitride does not fuse under the normal pressure and is difficult to be sintered, its sintering nature increases extremely when its particle size is below 2.5 microns, which is very favourable for the compaction of the mass at the time of the sintering at a high temperature. If minute aluminum nitride powder of less than 0.5 micron in average particle size should be employed, the proportion of metallic aluminum powder to the aluminum nitride powder can be further increased thus making it possible to reduce the proportion of aluminum nitride which is comparatively expensive, and at the same time mechanical strength of the sintered mass can be further increased. Such minute particles, however, are very difficult to produce and conspicuously decrease the mouldability giving rise to moulding distortions. On the other hand, if the particle size of metallic aluminum powder is over 2.5 microns compaction of the moulded mass at the time of nitriding reaction and high temperature sintering is not sufficient. The average particle size of below 2.5 microns of the starting powdery materials is extremely effective for the compaction of the moulded mass at the time of high temperature sintering. As for the proportion of metallic aluminum to aluminum nitride, the higher content of metallic aluminum not only saves comparatively expensive aluminum nitride, but also gives a higher density sintered mass. However when the weight ratio of aluminum to aluminum nitride is more than one to one, the non-reacting aluminum particles tend to mutually coagulate rendering it difficult to obtain a moulded and sintered mass of homogeneous structure. When the weight ratio of aluminum with respect to aluminum nitride is below one to three sufficient mouldability cannot be obtained, because of minute aluminum nitride particles, and moulding distortions tend to be caused at the time of moulding operation. Though this kind of distortion may be avoided by lowering the moulding pressure, a high compact mass can not be obtained due to its higher porosity.

Although the moulded and sintered mass may be obtained by adding an organic binding agent to the mixture of aluminum nitride powder, metallic aluminum powder, and aluminum oxide powder, moulding the admixture, and sintering the moulded mass by the conventional means in the nitrogen atmosphere, the density and homogeneity of the structure, and the mechanical strength of the moulded and sintered mass may be improved when the sintering of the moulded mass is made in a manner described below.

To the mixture consisting of aluminum nitride powder, metallic aluminum powder and aluminum oxide powder is added an oragnic binding agent such as paraffin, stearic acid, polyvinyl alcohol and the like, cold moulding the admixture, accommodating the moulded mass in a muffle together with a filling powder having a high melting point such as aluminum nitride, boron nitride, silica and the like, and gradually heating the muffle containing the moulded mass from room temperature to about 300 to 400° C. in a nitrogen or inert gas atmosphere so as to partially evaporate the added organic binding agent and then eliminate the remainder by decomposition of free carbon which reacts with the $Al_2O_3$ as discussed previously to form carbon monoxide. After taking the moulded mass out of the muffle, the nitriding reaction of aluminum contained in the moulded mass is carried out by maintaining the moulded mass at a temperature of from 580 to 620° C. in a nitrogen or ammonia stream. The completion of the nitriding reaction of aluminum can be confirmed by the presence or absence of exothermic reaction of the moulded mass. Upon completion of the nitriding reaction the mould is again loaded in the muffle together with a powdery filling substance such as aluminum nitride, boron nitride and the like and the sintering is carried out by placing the muffle in the nitrogen or inert gas atmosphere and heating it to a temperature of 1,600 to 2,000° C. When the sintering temperature is below 1,600° C. the sintering of the moulded mass can not sufficiently be attained, and with the sintering temperature of more than 2,200° C. a portion of aluminum nitride sublimes.

As has been described in the foregoing, according to this invention, by incorporating aluminum oxide in the starting material the residual carbon in the moulded and sintered mass of aluminum nitride is noticeably decreased, thus making it easy to obtain the moulded and sintered mass whose mechanical strength and resistance against corrosion to molten metal is excellent and which will not affect the purity of the molten metal. Further, by regulating the particle size and mixing proportion of aluminum nitride and metallic aluminum, the contact between aluminum particles is prevented by the intervention of aluminum nitride particles thus minimising the temperature rise due to the nitriding reaction, as well as preventing aluminum particles from becoming viscous, from coagulating together and from causing the structure of the moulded and sintered mass to be heterogeneous. Also, as the greater proportion of aluminium can be used, not only the free flow of the mixed powders is improved but also the mixing proportion of the expensive aluminum nitride can be decreased, reducing the cost of the products. Further, by gradually carrying out the elimination of the organic binding agent in a muffle containing the filling substance the residual carbon may be extremely minimised, and by carrying out the nitriding reaction of aluminum powder with powdery filling substance removed, the contact of the aluminum powder with nitrogen gas can be sufficiently achieved. Further, by conducting the sintering operation in the presence of the powdery filling substance subsequent to the nitriding reaction, the moulded and sintered mass is uniformly heated and the contamination by the treatment gas and impure substances released from the furnace wall is prevented. Consequently, there may be obtained a moulded and sintered mass of a high density, a homogeneous structure and superior mechanical strength, since there is no molten non-reacting aluminum flowing out to its surfaces.

The following examples are given by way of illustration and are not intended for purposes of limitation.

EXAMPLE 1

8 g. of stearic acid was added to a mixture consisting of 65 g. of aluminum nitride powder sieved through a 325 Tyler mesh, 15 g. of aluminum oxide powder passed through a 325 Tyler mesh and 20 g. of metallic aluminum powder passed through a 200 Tyler mesh, and the admixture moulded at a pressure of 10 ton/cm.$^2$ into a cylindrical body 8 mm. in diameter and 20 mm. in length. The moulded body was placed within a muffle furnace made of molybdenum and filled with aluminum nitride powder and was subjected to heating treatment in a nitrogen gas flown at a rate of 800 litres per hour under the following rates of temperature increment.

| From: | ° C. per hour |
|---|---|
| Room temperature to 300° C. | 50 |
| 300° C.–400° C. | 25 |
| 400° C.–550° C. | 50 |
| 550° C.–700° C. | 25 |
| 700° C.–1,700° C. | 200 |

The temperature of 1,700° C. is maintained for four hours before cutting off the heat source. The flexural strength of the moulded and sintered body obtained was found to be 17.5 kg./mm.$^2$, the aluminum oxide remaining in the moulded and sintered body was 6.2 weight percent, and the residual carbon was 0.05 weight percent.

By way of comparison with the conventional method, 80 g. of the same aluminum powder and 20 g. of metallic aluminum powder as used in the previous example was employed as a starting material and mixed together, and a moulded and sintered body was produced in the similar process as in the above example. The flexural strength of the moulded and sintered body was 13.0 kg./mm.$^2$, with the remaining aluminum oxide being 0.7 weight percent, and the residual carbon being 1.70 weight percent.

In the above and the following examples, the measurement of the flexural strength was made by setting a distance of 10 mm. between both supporting points.

As is apparent from the above example, the addition of aluminum oxide the residual carbon was outstandingly decreased, and the presence of remaining aluminum oxide improved the mechanical strength of the moulded and sintered body.

EXAMPLE 2

Aluminum nitride powder, aluminum oxide powder and metallic aluminum powder, all seived through a 325 Tyler mesh were mixed together in proportions as shown in Table 1, and to each of the mixture was added paraffin as the organic binder. Each admixture was then moulded with a pressure of 5 ton/cm.$^2$ into a cylindrical moulding 8 mm. in diameter and 20 mm. in length. The obtained mouldings were subjected to a sintering operation by loading them in a carbon container filled with aluminum nitride powder, elevating the temperature at a rate of 100° C. per hour up to 1,800° C. in a nitrogen gas flown at a rate of 800 litres per hour, and maintaining the final temperature for 3 hours before cutting off the heat source.

The results of measurements of the sintered density, flexural strength and the amounts of remaining aluminum oxide and residual carbon are shown in Table 1.

TABLE 1

| Sample | Composition in weight | | | | Density, g./cc. | Flexural strength, kg./mm.$^2$ | Impurities, wt. percent | |
|---|---|---|---|---|---|---|---|---|
| | AlN | Al$_2$O$_3$ | Al | Paraffin | | | Al$_2$O$_3$ | C |
| 1 | 65 | 15 | 20 | 3 | 2.59 | 18.0 | 11.2 | 0.04 |
| 2 | 65 | 15 | 20 | 8 | 2.48 | 15.9 | 9.4 | 0.08 |
| 3 | 70 | 10 | 20 | 3 | 2.58 | 16.7 | 7.4 | 0.10 |
| 4 | 70 | 10 | 20 | 8 | 2.49 | 15.2 | 6.9 | 0.17 |
| 5 | 75 | 5 | 20 | 3 | 2.55 | 14.3 | 3.5 | 0.25 |
| 6 | 75 | 5 | 20 | 8 | 2.45 | 12.0 | 3.3 | 0.45 |
| 7 | 78 | 2 | 20 | 3 | 2.58 | 11.5 | 1.5 | 0.36 |
| 8 | 78 | 2 | 20 | 8 | 2.48 | 10.3 | 1.10 | 0.88 |
| 9 | 85 | 10 | 5 | 8 | 2.20 | 8.7 | 8.9 | 0.08 |
| 10 | 80 | 10 | 10 | 8 | 2.38 | 9.7 | 7.7 | 0.10 |
| 11 | 60 | 10 | 30 | 8 | 2.59 | 15.5 | 5.8 | 0.18 |
| 12 | 50 | 10 | 40 | 8 | 2.58 | 18.1 | 5.9 | 0.18 |
| 13 | 30 | 10 | 60 | 8 | 2.61 | 19.2 | 4.9 | 0.29 |
| 14 | 20 | 10 | 70 | 8 | 2.65 | 21.2 | 5.1 | 0.24 |
| 15 | 10 | 10 | 80 | 8 | 2.70 | 24.3 | 4.8 | 0.41 |
| 16 | 80 | 0 | 20 | 8 | 2.42 | 9.7 | 0.05 | 0.85 |

In the above table, the sample 16 is manufactured in the conventional method and when compared with samples 1 to 15 it is clear that the addition of aluminum oxide is effective in increasing the flexural strength and in minimising the amount of residual carbon.

EXAMPLE 3

Five species of powdery aluminum nitride with respective mean grain sizes of 4.6 microns, 2.9 microns, 2.5 microns, 1.5 microns and 0.5 micron and two species of powdery metallic aluminum with respective mean grain sizes of 2.5 microns and 1.9 microns were used as the starting material in combinations as shown in Table 2 such that the total weight of each combination is 200 g., and 20 g. of aluminum oxide powder was added to each combination, which is then mixed in a ball mill pot for 48 hours. To each mixture was added 5 weight percent of stearic acid as a binding agent and individual admixtures were cold moulded with a pressure of either 5 ton/cm.$^2$ or 10 ton/cm.$^2$ into cylindrical bodies 8 mm. in diameter and 15 mm. in length. Each sample admixture was heated to 300° C. taking one hour and from 300 to 400° C. taking three hours to eliminate stearic acid as much as possible. The temperature of the sample was then raised up to 600° C. taking three hours in a nitrogen gas flow, and was kept at 600° C. for three hours to complete nitriding treatment.

During the nitriding operation, the temperature of the samples using aluminum nitride with particle sizes between 2.9 microns and 4.6 microns increased due to intensive heat generated. Such temperature change was not observed for samples using aluminum nitride having a particle size of below 2.5 microns. The exothermic phenomenon observed for aluminum nitride with grain size in the range between 2.9 microns and 4.6 microns had an outstanding tendency of being more prominent in proportion to the increased content of metallic aluminum. The samples thus underwent the nitriding treatment were then sintered by raising the temperature to 1,700° C. at a rate of 200° C. per hour and retaining that temperature for 6 hours to bring about compaction of the moulded and sintered sample.

Various characteristics of the moulded and sintered bodies thus obtained are listed in Table 2. The examination of the homogeneity of the structure was made by the observation of the cross section of the moulded and sintered body and measurement of the distribution of hardness. In Table 2, symbol O represents homogeneous structure, symbol △ slightly homogeneous structure and symbol X non-homogeneous structure.

TABLE 2

| Samples | Aluminum nitride | | Metallic aluminum | | Various characteristics of the moulded and sintered bodies | | | |
|---|---|---|---|---|---|---|---|---|
| | Average particle size, micron | Proportion, wt. percent | Average particle size, micron | Proportion, wt. percent | Moulding pressure, ton/cm.$^2$ | Homogeneity | Density, percent | Flexural strength, kg./mm. |
| 17 | 4.6 | 85 | 1.9 | 15 | 10 | △ | 80.5 | 8.1 |
| 18 | 4.6 | 80 | 1.9 | 20 | 10 | X | 85.5 | 17.6 |
| 19 | 4.6 | 75 | 1.9 | 25 | 10 | X | 89.0 | 15.1 |
| 20 | 2.9 | 85 | 1.9 | 15 | 10 | O | 81.4 | 7.5 |
| 21 | 2.9 | 80 | 1.9 | 20 | 10 | △ | 83.2 | 15.5 |
| 22 | 2.9 | 75 | 1.9 | 25 | 10 | X | 90.7 | 25.7 |
| 23 | 2.5 | 80 | 1.9 | 20 | 10 | O | 84.1 | 13.8 |
| 24 | 2.5 | 75 | 1.9 | 25 | 10 | O | 91.5 | 25.0 |
| 25 | 2.5 | 70 | 1.9 | 30 | 10 | △ | 93.0 | 22.1 |
| 26 | 1.5 | 80 | 1.9 | 20 | 10 | O | 85.5 | 8.2 |
| 27 | 1.5 | 75 | 1.9 | 25 | 10 | O | 91.1 | 23.0 |
| 28 | 1.5 | 70 | 1.9 | 30 | 10 | O | 94.0 | 28.1 |
| 29 | 1.5 | 65 | 1.0 | 35 | 10 | △ | 93.5 | 30.5 |
| 30 | 0.5 | 70 | 1.9 | 30 | 10 | O | 93.5 | 35.5 |
| 31 | 0.5 | 60 | 1.9 | 40 | 10 | O | 94.4 | 34.1 |
| 32 | 0.5 | 50 | 1.9 | 50 | 10 | O | 95.5 | 39.5 |
| 33 | 0.5 | 45 | 1.9 | 55 | 10 | X | 95.0 | 38.4 |
| 34 | 1.5 | 65 | 1.9 | 35 | 5 | O | 80.5 | 27.1 |
| 35 | 2.5 | 70 | 1.9 | 30 | 5 | O | 90.1 | 23.2 |
| 36 | 2.5 | 70 | 2.5 | 30 | 5 | O | 87.1 | 25.1 |
| 37 | 2.5 | 75 | 2.5 | 25 | 10 | O | 90.4 | 24.8 |

Though not shown in Table 2, however, with the samples whose average aluminum nitride particle sizes are 2.5 microns, 1.5 microns and 0.5 micron, and whose aluminum content is below 2⁵% distortions due to a high moulding pressure are observed in the moulded and sintered mass, this phenomenon being more pronounced when the particle size and the aluminum content are smaller. The moulded and sintered mass of compact nature and homogeneous structure are observed to be obtained by using aluminum nitride with an average particle size in a range between 0.5 micron and 2.5 microns and an aluminum content of 25 to 50 percent.

For the purpose of comparison the procedure of Example 3 was followed except that sintering operation was conducted at the temperature of 2,000° C. This resulted in more compact sintered masses than those of Example 3.

EXAMPLE 4

80 g. of aluminum nitride powder with average particle size of 2.8 microns, 20 g. of aluminum powder with average particle size of 1.9 microns and 10 g. of aluminum oxide powder were mixed in a ball mill for three hours. To the mixture was added 3 g. of paraffin as a binding agent and the admixture was moulded with a pressure of one ton/cm.² into a disc 50 mm. in diameter and 5 mm. in thickness. The moulding was then placed within a cylindrical muffle made of molybdenum 80 mm. in diameter and 100 mm. in height together with sintered powder of aluminum nitride. The muffle was then put in an electric furnace equipped with a carbon heater as the heat source. Then as the first heating step the temperature of the moulded disc was elevated in a nitrogen gas flow with a flow rate of 1,000 litres per hour and at temperature increment rates as shown in Table 3.

TABLE 3

Temperature—Temperature increment rate (° C./hr.)
Room temperature to 300° C.—100
300° C.–400° C.—25

After the temperature reached 400° C., the heat source was cut off and the disc was left to cool down. As the second heating step, the moulded disc deprived of organic binding agent in the first heating step was placed on a table of aluminum nitride disposed within a tubular furnace using a high purity quarts tube and provided with a heat source consisting of a corundum heater, and the nitriding reaction was carried out by passing the nitrogen gas through the furnace at a rate of 800 litres per hour and elevating the temperature of the furnace at a rate of 50° C. per hour up to 600° C., and this temperature was maintained for one and a half hours. After the completion of the nitriding reaction the sample was further heated by placing it within a container made of carbon together with aluminum nitride powder in a nitrogen gas flown at a rate of 800 litres per hour and at a temperature increment rate of 100° C. per hour up to 1,700° C., the final temperature being maintained for three hours.

The obtained moulded and sintered body had a flexural strength of 19.2 kg./mm.², a homogeneous fine surface and internal structure, and the residual carbon content of 0.03 weight percent.

EXAMPLE 5

The same first and second heating steps as in Example 4 were repeated. Subsequently, the temperature of the sample was once again raised from room temperature to 2,100° C. at a rate of 100° C. per hour and the final temperature was maintained for three hours to complete sintering.

The obtained moulded and sintered body had the flexural strength of 25.4 kg./mm.², a homogeneous fine surface and internal structure, and the residual carbon content of 0.02 weight percent.

While the invention has been described in connection with some specific examples thereof, it is to be understood that various changes and modifications may be made without departing from the scope and spirit of the invention.

What is claimed is:

1. A method of manufacturing a moulded and sintered mass of aluminum nitride substantially free of carbon which comprises:
   (A) cold moulding an admixture consisting essentially of aluminum nitride powder, aluminum oxide powder, aluminum metal powder and an organic binding agent, the weight of said aluminum nitride in the admixture being one to three times that of the aluminum metal and the weight of aluminum oxide being at least equal to 2.8 times the weight of carbon contained in said organic binding agent,
   (B) heating the moulded mass in nitrogen or an inert gas atmosphere to at least about 300° C. to eliminate the organic binding agent,
   (C) nitriding aluminum metal contained in the moulded mass resulting from step B at a temperature below the melting point of aluminum in an atmosphere of nitrogen or ammonia gas, and
   (D) sintering the moulded mass resulting from step C in an atmosphere of nitrogen or inert gas at a temperature between about 1,600 and 2,200° C.

2. A method as claimed in claim 1 wherein step B is carried out by imbedding the moulded mass resulting from step A in a filling powder selected from the group consisting of aluminum nitride, boron nitride and silica contained in a muffle and slowly elevating the temperature of the moulded body to a temperatures less than 400° C., said nitriding step C is carried out by subjecting the moulded mass to a temperature ranging between about 580 to 620° C. and said sintering step D is performed by imbedding the moulded mass resulting from step C in a filling powder selected from the group consisting of aluminum nitride and boron nitride contained in a muffle.

3. A method as claimed in claim 1 wherein said weight of aluminum oxide is between 2 and 15% by weight of the combined weight of aluminum nitride, aluminum oxide and aluminum metal.

4. A method as claimed in claim 1 wherein the average particle size of the aluminum nitride powder is between about 0.5 and 2.5 microns and the average particle size of the aluminum metal powder is less than 2.5 microns.

5. A method as claimed in claim 1 wherein the aluminum metal content of said admixture is between 25 and 50% by weight.

6. A method as claimed in claim 1 wherein the moulded mass in step B is heated to a temperature between about 300 and 400° C.

7. A method as claimed in claim 1 wherein the moulded mass in step C is maintained at a temperature between about 580 and 620° C. during said nitriding.

References Cited
UNITED STATES PATENTS

| | | | |
|---|---|---|---|
| 3,436,179 | 4/1969 | Matsjo et al. | 23—192 |
| 3,287,478 | 11/1966 | Pallen et al. | 23—192X |
| 3,238,018 | 3/1966 | Winter et al. | 23—192 |
| 3,108,887 | 10/1963 | Lenie et al. | 23—192X |
| 2,929,126 | 3/1960 | Bollack et al. | 23—192 |
| 2,928,733 | 3/1960 | Wagner | 75—224 |
| 2,568,157 | 9/1951 | Lepp et al. | 75—223X |
| 2,510,546 | 6/1950 | Brennan | 75—223X |

OSCAR R. VERTIZ, Primary Examiner

C. B. RODMAN, Assistant Examiner